Figure 1:
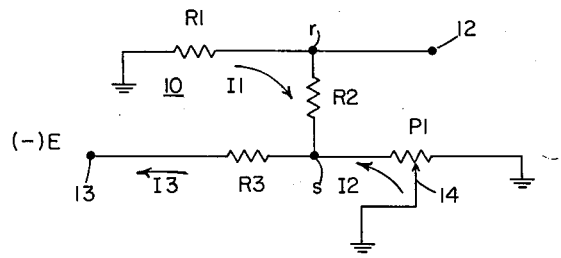

May 7, 1963     R. L. CHASE     3,088,671

MULTIPLIER CIRCUIT

Filed June 22, 1960

INVENTOR.
ROBERT L. CHASE
BY

United States Patent Office 3,088,671
Patented May 7, 1963

3,088,671
MULTIPLIER CIRCUIT
Robert L. Chase, Blue Point, N.Y., assignor to the United States of America as represented by the United States Atomic Energy Commission
Filed June 22, 1960, Ser. No. 38,083
5 Claims. (Cl. 235—194)

This invention relates to an electronic fast multiplier circuit and more particularly to an electronic fast multiplier circuit employing a transistor controlled voltage divider.

In slow speed (direct current) multiplier circuits, servo-driven potentiometers are conventionally employed to effect the multiplication of two potentials. For fast multiplication circuits, however, the conventionally available means for varying the potentiometer resistance, motor-driven servo-mechanisms and the like, have response times which are too great to be adaptable to such use. As a consequence, in high speed multipliers, various other expedients have been used to obtain the multiplication. One approach makes use of the so-called squaring tube. With a type of squaring tube having the required characteristics, it is possible to obtain a value of output which is equal to the square of the sum or difference of two separate inputs. By using two squaring tubes of this type suitably coupled to two input circuits, it is possible to obtain outputs from each tube which are equal to $(A+B)^2$ and $(A-B)^2$, where A and B represent the two input potentials to be multiplied. By arrangement of the circuitry inter-connecting the output of the two squaring tubes, it then becomes possible to subtract the quantity $(A-B)^2$ from the quantity $(A+B)^2$. Simple algebra shows the result to be equal to 4AB. By selection of an appropriate scale factor to divide the quantity 4AB by a constant 4, the value AB is obtained.

The above described method is ingenious and accurate. However, it requires costly electronic tubes of special construction. Instead of squaring tubes, squaring diodes can be used in an exactly analogous manner. However, the squaring diode has a limited useful range; its accuracy is not too good; and it suffers from drift.

Another electronic multiplier generates a pulse-signal made up of rectangular pulses repeated at a constant rate and whose time-widths are varied proportional to one input potential (A) as the heights are varied proportional to the other input potential (B). Rectification of the resultant pulse-signal results in the generation of a potential proportional to the product of the input potentials. This method, however, suffers from the deficiency that special techniques are required to adapt it for use in high speed pulse multiplication applications where multiplication times on the order of a microsecond are required.

The disadvantages of the above-mentioned techniques for multiplying signals are overcome by this invention in which there is provided an arrangement for obtaining the product of two voltages of the type found in high speed, that is, microsecond, pulsed electronic circuits, without the use of the special costly electronic tubes mentioned above. Basically, the construction involved in this invention is that of a voltage divider network in which an array of transistors is provided for switching out resistances electrically thereby avoiding the slow and cumbersome mechanical arrangements usually used for this purpose. The transistor array is combined with a series of resistances of specific ascending values so that the error due to approximation is limited to a small and permissible value. Furthermore, the transistor arrangement provides for a smooth and small incremental increase in resistance over the range of operation of the apparatus which is a further improvement over some of the arrangements previously described.

It is, therefore, a first object of this invention to provide a high speed multiplier circuit utilizing electronic voltage division.

A further object of this invention is the provision of a transistorized potentiometer.

Still another object of this invention is the provision of a multiplier circuit having no moving parts.

Still another object is the provision of a transistorized divider network in which the percentage error is maintained constant throughout its range of operation.

Figure 2:
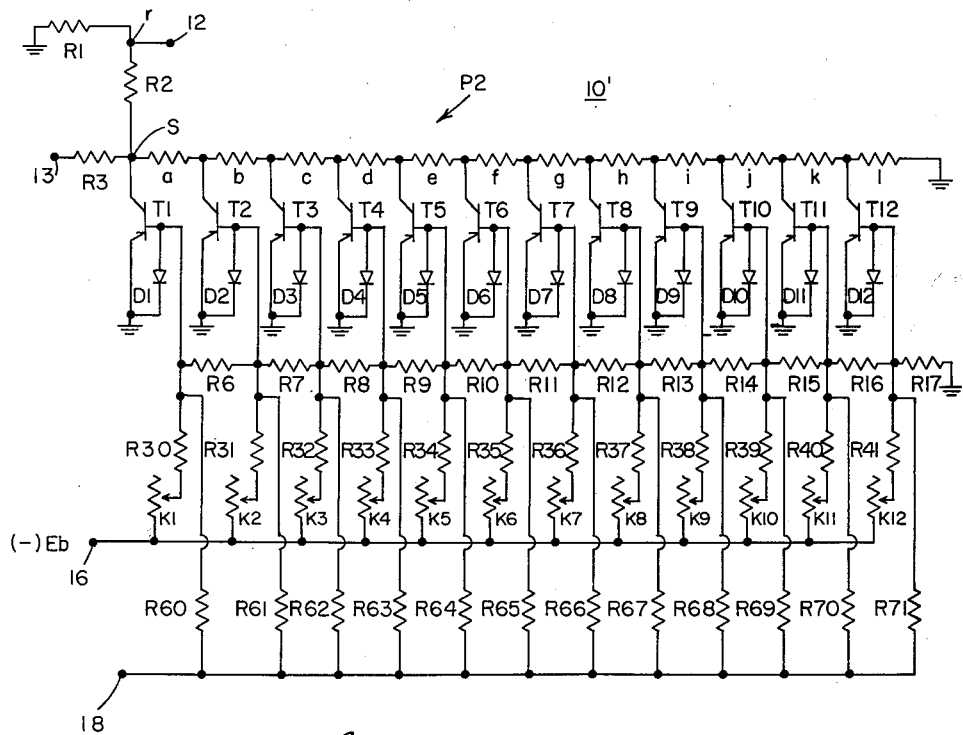

Other objects and advantages of this invention will hereinafter become more readily apparent from the following description of the drawing in which:

FIG. 1 is a schematic electrical diagram of the voltage divider network capable of utilizing the transistor array involved in this invention; and FIG. 2 is a detailed electrical diagram showing a preferred embodiment of this invention.

Referring to the drawing wherein like characters are used for like parts throughout the views, there is shown in FIG. 1 a voltage divider network 10 consisting of resistors R1, R2, R3 and an element described as a potentiometer P1 for convenience. Resistors R1, R2 and R3 are connected in series with the unjoined end of resistor R3 connected at a contact 13 to a source of constant potential, in this case negative, E and the unjoined end of resistor R1 is connected to ground so that resistors R1, R2 and R3 comprise a voltage divider network. Point $r$, the common point between resistors R1 and R2, is connected to an output contact 12 where a measurement of a voltage Vo is obtained as the output of this arrangement. Potentiometer P1 is connected between the common point $s$ between resistors R2 and R3 and ground with the wiper 14 thereof likewise connected to ground. Thus, the whole resistance between point $s$ through potentiometer P1 to ground defined as Rx is that marked off by wiper 14 shortcircuiting potentiometer P1 at that point. In effect, the resistance Rx to current flow from point $s$ through potentiometer P1 to ground is the portion of the full resistance of potentiometer P1 marked off by wiper 14. Wiper 14 is positioned along the full resistance value of P1 as a direct function of the multiplicand. The multiplier is represented by the voltage E on contact 13. The voltage output Vo on contact 12 is a direct function of the product of E and the resistance value Rx. It is understood that ground is at some reference potential and the three ground designations may under suitable circumstances be at different reference levels.

In the operation of the circuit of FIG. 1, it is seen that normally current flow is from ground through resistors R1, R2 and R3 to contact 13 the source of (−) E. This current flow from ground to point $s$ through resistors R1 and R2 is indicated by $I_1$. Current flow through potentiometer P1 is from ground through contact 14 to point $s$ and is indicated in conventional current flow manner as $I_2$. Current flow through resistor R3 is in the direction toward contact 13 and is designated by $I_3$. For the purposes of accomplishing this invention, the resistance values of R2 and R3 are very high in comparison with the total resistance value of potentiometer P1, i.e., of the order of 20 times as large or greater so that the bulk of the current flow $I_3$ comes through contact 14, and is $I_2$. If the total resistance of potentiometer P1 is very small to begin with, in comparison with resistance of R2 and R3, it is seen that movement of wiper 14 will affect to a large extent the voltage $Vo$ found on contact 12, and that by simple analysis based on Kirchoff's laws, $Vo$ is a direct function of $Rx$ and $E$, or $$Vo = KER_x$$

where K is a constant conversion factor.

A circuit of the type just described in connection with FIG. 1 is generally understood in the art and not believed to be particularly novel. However, the particular construction and arrangement of potentiometer P1 associated with the remaining elements of the circuit, accomplishes in the manner to be described further below the purposes of this invention.

Referring to FIG. 2 for a more detailed description of a preferred embodiment of this invention, resistors R1, R2 and R3 are connected between ground and contact 13 as in FIG. 1 and point $r$ is connected to contact 12 for the output measured voltage $Vo$. In place of potentiometer P1, however, and its wiper 14, there is provided an arrangement which can be identified for convenience as P'1. This arrangement, P'1 includes from connection $s$ to ground a plurality of resistors $a, b, c \ldots l$ in series and having ascending resistance values as will be described further below. A transistor T1 of the PNP type having a common emitter connection, is connected with the collector to $s$ and emitter to ground. In like fashion, succeeding transistors T2 through T12 are connected to the succeeding common points between adjacent resistors $a, b, c$, etc. as illustrated. The base of the transistor T1 is connected through a resistor R30 to the wiper of a rheostat K1 which is connected in turn to a contact 16 on which is imposed a fixed negative potential $Eb$ such as —5 volts. In like fashion, transistors T2 through T12 have their bases connected through resistors R31 through R41 respectively, to the wipers of rheostats K2 through K12, respectively, which are connected at their opposite ends in parallel to contacts 16 and the source of the bias voltage $Eb$. A plurality of resistors R6, R7 ... R17 of equal value are connected between adjacent bases of the transistors T1 through T12 in the manner illustrated with resistor R17 grounded at one end. The purpose of $Eb$ is to provide bias on transistors T1 through T12 in the manner and for a purpose to be described further below. The input to electronic potentiometer P'1 is electrical in nature and appears on a contact 18 through a succession of resistors R60, R61 ... R71 which increase in value at a rate to be described below. Each of resistances R60 through R71 is connected to deliver its signal to the base of its associated transistor for example, R60 is connected between contact 18 and the base of transistor T1. The input signal on contact 18 being the multiplicand (in voltage form) alters the bias condition on all of the transistors in varying degrees, as will be explained further below, to obtain the electronic voltage division in P'1. Rheostats K1, K2, K3, etc. permit the adjustment of the bias on the bases of the respective transistors in accordance with the operation of this apparatus.

To insure that the approximation obtained in the result of $Vo$ is of small but constant error throughout the the whole range of operation, the values of resistances, $a, b, c$, etc. and resistances R60, R61, etc. are made to ascend in values in such a way that this constant error will be maintained. For this purpose, resistances $a$ through $l$ are arranged in ascending sequence, such that the resistance value of each succeeding resistance is increased by an amount which makes the ratio of the sum of the resistance values of N individual resistance elements divided by the sum of the preceding $N-1$ resistance elements equal a constant ratio and to the ratio of the sum of the $N+1$ resistance elements divided by the sum of the resistance values of N resistance elements. Resistances R60, R61, R62, etc. are made to ascend in value with successive resistor values having a ratio R.

Diodes D1 through D12 are connected between the base and ground of transistors T1 through T12, respectively, to protect the transistors from over-voltages.

In the operation of the arrangement shown in FIG. 2, the negative fixed bias potential $Eb$ is placed on contact 16. Rheostats K1 through K12 are adjusted so that each of transistors T1 through T12 is conducting. With transistor T1, for example, fully conducting, point $s$ is at ground or only slightly below ground potential and the resistance of P'1 is effectively short circuited so that the output voltage $Vo$ on contact 12 is also ground or zero. Assume the application of a negative potential on contact 13 and the additional application of a positive voltage on contact 18 representing the multiplier and multiplican, respectively, causing current flow to be drawn through resistors R60, R61, etc. In view of the ascending values of these resistances, the amounts of current drawn will, of course, decrease going from R60, R61, . . . to R71. Should the positive voltage on contact 18 increase in value, the current drawn from contact 16 is increased thereby reducing current through the base of transistor T1. At some particular voltage level on contact 18 current flow through transistor T1 and succeeding transistors T2 and T3, for example, will cease and they will be completely cut off, thereby introducing a resistance equivalent to the movement of wiper 14 in FIG. 1. At intermediate values of voltage on contact 18, transistors T1, T2 and T3 will draw different amounts of current so that instead of $s$ being at ground, it will be at a level determined by the combined resistance of $a, b$, T1 and T2. If the input signal on contact 18 is increased further, assume that it reaches a level where transistors T1 through T5 will be completely nonconducting due to the amount of current going through their respective resistors, R60, R61, R62, R63 and R64. Due to the further increase in current drawn through resistor R65, transistors T6 and T7 will not be completely blocked, however, they will have reduced current flow therethrough so that in effect the resistance introduced by electronic potentiometer P'1 is equal to $a+b+c+d+e$ plus the combined effect of $f$ and $g$ and transistors T6 and T7. Due to the increasing values of the resistances, R72, R74, R76, etc., the remaining transistors, T8, T10 etc. are still in a fully conducting condition. Thus, it is seen with the proper selection of the resistance values R60 through R71, and transistors T1 through T12 along with the proper biasing on contact 16, it is possible to obtain an increasing resistance value introduced by potentiometer P'1 corresponding with the resistance introduced by wiper 14 of potentiometer P1 shown in FIG. 1 in direct proportion to the voltage level of the signal on contact 18. Although transistors T1 through T12 are PNP types requiring negative biasing for their operation, the selection of alternate types of transistors would require reverse biasing arrangements.

It is understood that although a certain number of transistors have been shown in FIG. 2, this number may be increased or decreased in accordance with the degree of accuracy required and the cost involved in making the circuit. Obviously, a larger number of transistors can be used to cover the same range of total resistance and the accuracy of the multiplication can be improved somewhat if the change in resistance values between adjacent individual resistance elements will be decreased. However, the cost of the multiplier will increase proportionately. Coupling resistors R6 through R17 between the bases of adjacent transistors smooth the transition from step to step.

A circuit of the type shown in FIG. 2 was constructed and found to function successfully. For purposes of illustration, the following table lists the values of the components used:

Table

| | |
|---|---|
| Transistors: T1 through T12 | 2N501 |
| Diodes: D1 through D12 | 1N100 |
| R1 | 2K ohms |
| R2, R3 | 20K |
| R6 through R17, K1 through K12 | 10K |
| R28 | 1.8K |
| R30 through R41 | 12K |

| | Ohms | | Ohms |
|---|---|---|---|
| a | 51 | g | 68 |
| b | 15 | h | 82 |
| c | 24 | i | 130 |
| d | 30 | j | 150 |
| e | 43 | k | 240 |
| f | 51 | l | 300 |
| R60 | 10K | R66 | 56K |
| R61 | 13K | R67 | 75K |
| R62 | 18K | R68 | 100K |
| R63 | 24K | R69 | 130K |
| R64 | 33K | R70 | 180K |
| R65 | 43K | R71 | 240K |

It will be noted from the foregoing table that the value of *a* is larger than several of the next resistors in the sequence. The arbitrary selection of *a* and the ratio as described earlier determines the range of operation of the multiplier circuit and the values of *b, c, d,* etc.

For use of the circuit of FIG. 2 for dividing the bias E*b* is made positive thereby starting off with all of transistors T1 through T12 at cut-off and the input signal on contact 18 is negative so as to turn the transistors on in sequence instead of off. This is equivalent to multiplying with the reciprocal of the input on contact 18.

It is thus seen there has been provided a multiplier circuit which is completely electronic in nature, functions rapidly and is capable of handling input pulses of microsecond duration. The multiplier circuit uses a completely electronic potentiometer without any moving parts whatsoever so that the speed of its operation is not limited to the requirements of mechanical movements. Other modifications of this circuit which would be apparent to one skilled in the art have not been illustrated, however, by analogy with the slow speed direct current multiplier using a servo-controlled potentiometer it is possible by judicious provision of a direct current potential at the input on contact 13 to multiply the input potential on contact 18 by a value which is equal to the sum or difference of the changing input on contact 13 and the value of the applied direct current potential.

While only a preferred embodiment of this invention has been described, it is understood that the scope thereof is not limited thereto but is intended to be covered by the claims which follow:

I claim:

1. Electrical analog computer apparatus for obtaining as an approximation an output voltage whose amplitude is a direct function of the product of the amplitudes of first and second voltages, comprising a series circuit of first, second and third resistive elements connected from the source of a reference voltage level to the source of said first voltage, variable resistance means connected between the common electrical connection of said second and third resistive elements and the source of said reference voltage level, and transistorized means for electronically varying said resistance means as a direct function of the magnitude of said second voltage, the output voltage of said apparatus appearing at the common connection of said first and second resistive elements.

2. The analog computer apparatus of claim 1 in which said variable resistance means comprises a plurality of resistances connected in series, a transistor for each of said resistances having the emitter and collector of each transistor connected between one end of each said resistance and said reference voltage source, and means connected to the bases of said transistors responsive to the magnitude of said second voltage for progressively energizing and de-energizing said transistors and thereby progressively shorting out said resistive elements and effectively selecting the total resistance value of said variable resistance means.

3. The analog computer apparatus of claim 2 in which said resistances increase progressively in value away from said series circuit in order to maintain a constant proportionate error over the complete range of operation of said apparatus.

4. The apparatus of claim 2 in which the total resistance of said variable resistance means is small in comparison to said second resistive element to increase the accuracy of said apparatus.

5. The analog computer apparatus of claim 3 in which bias means are provided to bias each of said transistors individually and selectively for calibrating said apparatus.

References Cited in the file of this patent

UNITED STATES PATENTS 2,697,201  Harder _____ Dec. 14, 1954

OTHER REFERENCES

"Analog Computer Techniques" (Johnson), Published by McGraw-Hill, 1936 (p. 67 relied on).